United States Patent
Ko et al.

(10) Patent No.: US 12,531,579 B2
(45) Date of Patent: Jan. 20, 2026

(54) ELECTRONIC DEVICE AND METHOD FOR DIGITAL PREDISTORTION IN WIRELESS COMMUNICATION SYSTEM

(71) Applicant: SAMSUNG ELECTRONICS CO., LTD., Suwon-si (KR)

(72) Inventors: Gilwoong Ko, Suwon-si (KR); Youngyoon Woo, Suwon-si (KR); Jungwoo Ku, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 18/122,755

(22) Filed: Mar. 17, 2023

(65) Prior Publication Data
US 2023/0421185 A1 Dec. 28, 2023

Related U.S. Application Data

(63) Continuation of application No. PCT/KR2023/003044, filed on Mar. 6, 2023.

(30) Foreign Application Priority Data

Jun. 27, 2022 (KR) .................. 10-2022-0078541

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
None
See application file for complete search history.

(56) References Cited

U.S. PATENT DOCUMENTS

| | | | |
|---|---|---|---|
| 7,266,159 B2 | 9/2007 | Vella-Coleiro | |
| 7,289,773 B2 | 10/2007 | Braithwaite | |

(Continued)

FOREIGN PATENT DOCUMENTS

| | | |
|---|---|---|
| CN | 112953409 | 6/2021 |
| JP | 6314388 | 4/2018 |

(Continued)

OTHER PUBLICATIONS

Search Report and Written Opinion dated May 30, 2023 issued in International Patent Application No. PPCT/KR2023/003044.

(Continued)

*Primary Examiner* — Idowu O Osifade
(74) *Attorney, Agent, or Firm* — Nixon & Vanderhye P.C.

(57) ABSTRACT

According to embodiments, a method performed by an electronic device includes: identifying a channel bandwidth; identifying one or more active DPD units among a plurality of DPD units of a digital pre-distortion (DPD) circuit based on the channel bandwidth and amount of resource allocated within the channel bandwidth; generating a DPD output signal of the DPD circuit based on the one or more active DPD units; generating an amplifier output signal based on the DPD output signal of the DPD circuit, a digital-to-analog converter (DAC), and a power amplifier (PA). While the DPD output signal is generated, at least one DPD unit different from the one or more active DPD units among the plurality of DPD units of the DPD circuit is deactivated.

20 Claims, 8 Drawing Sheets

(56) References Cited

U.S. PATENT DOCUMENTS

| | | | |
|---|---|---|---|
| 8,576,943 B2 | 11/2013 | Kilambi et al. | |
| 8,912,848 B2 | 12/2014 | Lee et al. | |
| 9,036,736 B2 | 5/2015 | Chen et al. | |
| 9,647,717 B2 | 5/2017 | Xiong et al. | |
| 10,469,109 B2 | 11/2019 | Gutman et al. | |
| 10,701,694 B2 | 6/2020 | Khan et al. | |
| 10,931,320 B2 | 2/2021 | Megretski et al. | |
| 2005/0157814 A1 | 7/2005 | Cova et al. | |
| 2005/0253745 A1 | 11/2005 | Song et al. | |
| 2011/0260792 A1 | 10/2011 | Ishikawa et al. | |
| 2014/0292406 A1 | 10/2014 | Dechen et al. | |
| 2014/0333376 A1 | 11/2014 | Hammi | |
| 2017/0353163 A1* | 12/2017 | Gazneli | H03F 3/195 |
| 2020/0382147 A1 | 12/2020 | Menkhoff et al. | |
| 2021/0234564 A1* | 7/2021 | Langer | H03F 3/245 |
| 2023/0361722 A1 | 11/2023 | Chen et al. | |

FOREIGN PATENT DOCUMENTS

| | | |
|---|---|---|
| KR | 10-0959032 | 5/2010 |
| KR | 10-0991494 | 10/2010 |
| KR | 10-1492381 | 2/2015 |
| KR | 10-2017-0091854 | 8/2017 |
| KR | 10-1931150 | 12/2018 |
| KR | 10-2021-0013714 | 2/2021 |
| WO | 2018/227093 | 12/2018 |

OTHER PUBLICATIONS

Extended European Search Report dated May 26, 2025 for EP Application No. 23831664.0.

* cited by examiner

ELECTRONIC DEVICE AND METHOD FOR DIGITAL PREDISTORTION IN WIRELESS COMMUNICATION SYSTEM

CROSS-REFERENCE TO RELATED APPLICATIONS

This application is a continuation of International Application No. PCT/KR2023/003044 designating the United States, filed on Mar. 6, 2023, in the Korean Intellectual Property Receiving Office and claiming priority to Korean Patent Application No. 10-2022-0078541, filed on Jun. 27, 2022, in the Korean Intellectual Property Office, the disclosures of which are incorporated by reference herein in their entireties.

BACKGROUND

Field

The disclosure relates to a wireless communication system. For example, the disclosure relates to an electronic device and a method for digital predistortion (DPD) in the wireless communication system.

Description of Related Art

In a wireless communication system, a digitally modulated signal is amplified through a radio frequency (RF) power amplifier. A high linear characteristic of the power amplifier is required for transmission without distortion of signal. In order to provide high linearity of the power amplifier, digital predistortion (DPD) for changing an input signal so that output of the power amplifier is close to an ideal state is used.

SUMMARY

Embodiments of the disclosure provide an electronic device and a method for performing digital predistortion (DPD) control based on resource allocation.

Embodiments of the disclosure provide an electronic device and a method for determining a memory order of a DPD circuit based on the resource allocation.

Embodiments of the disclosure provide an electronic device and method for DPD modeling of the DPD circuit based on the resource allocation.

Embodiments of the disclosure provide an electronic device and method for adaptively adjusting the complexity of the DPD circuit for compensation of a memory effect based on the resource allocation.

According to various example embodiments, a method performed by an electronic device may include: identifying a channel bandwidth; identifying one or more active digital pre-distortion (DPD) units among a plurality of DPD units of a DPD circuit based on the channel bandwidth and amount of resource allocated within the channel bandwidth; generating a DPD output signal of the DPD circuit based on the one or more active DPD units; generating an amplifier output signal based on the DPD output signal of the DPD circuit, a digital-to-analog converter (DAC), and a power amplifier (PA); based on the DPD output signal being generated, at least one DPD unit different from the one or more active DPD units among the plurality of DPD units of the DPD circuit may be deactivated.

According to various example embodiments, the electronic device may include: a processor; a digital pre-distortion (DPD) circuit; a digital-to-analog converter (DAC); and a power amplifier (PA). The processor may be configured to: identify a channel bandwidth; identify one or more active DPD units among the plurality of DPD units of the DPD circuit based on the channel bandwidth and the amount of resource allocated within the channel bandwidth; control the DPD circuit to generate the DPD output signal based on the one or more active DPD units; generate the amplifier output signal based on the DPD output signal of the DPD circuit through the DAC and the PA; wherein, based on the DPD output signal being generated, the at least one DPD unit different from the one or more active DPD units among the plurality of DPD units of the DPD circuit may be deactivated.

An electronic device and a method according to various example embodiments of the present disclosure can more accurately compensate for a distortion characteristic of a power amplifier by adjusting the complexity of a DPD circuit based on the amount of allocated resources.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
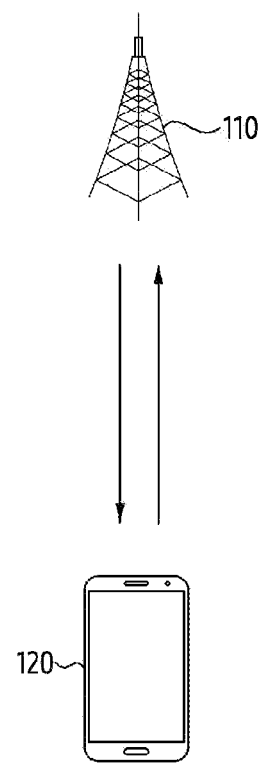
FIG. 1 is a diagram illustrating a wireless communication system according to embodiments.

Terms used in the present disclosure are used simply to describe example embodiments, and are not intended to limit the scope of the disclosure. A singular expression may include a plural expression unless it is clearly meant differently in context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, and should not be interpreted in an ideal or excessively formal meaning. In some cases, even terms defined in the present disclosure should not be interpreted to exclude embodiments of the present disclosure.

In various embodiments of the present disclosure described below, a hardware approach is described as an example. However, since the various embodiments of the present disclosure include technology that use both hardware and software, the various embodiments of the present disclosure do not exclude a software-based approach.

A term referring to a signal (e.g., signal, signal flow, compound signal, digital signal, analog signal, modulation signal, distortion signal), a term referring to a resource (e.g., time, symbol, slot, subframe, radio frame, subcarrier, resource element, resource block, bandwidth part (BWP), occasion), a term for an operational state (e.g., step, operation, procedure), a term referring to a channel, a term referring to a network entity, a term referring to a component of a device, and the like used in the following description are illustrated for convenience of description. Accordingly, the present disclosure is not limited to terms described below, and another term having an equivalent technical meaning may be used.

A term referring to a component of an electronic device (e.g., module, antenna, antenna element, circuit, processor, chip, component, device), a term referring to a circuit (e.g., combined circuit, coupled circuit, separation circuit, distribution circuit, PIMC circuit, harmonic removal circuit), a term referring to a shape of a component (e.g., structure, construction, supporting portion, contacting portion, protruding portion), a term referring to a circuit (e.g., PCB, FPCB, signal line, feeding line, data line, RF signal line, antenna line, RF path, RF module, RF circuit, splitter, divider, coupler, combiner), and the like used in the following description are illustrated for convenience of description. Accordingly, the present disclosure is not limited to terms described below, and another term having an equivalent technical meaning may be used. In addition, a term such as '. . . portion', '. . . er', '. . . structure', '. . . construction', and the like used below may refer, for example, to at least one shape structure, or may refer, for example, to a unit that processes a function.

In addition, in the present disclosure, in order to determine whether a specific condition is satisfied or fulfilled, an expression of more than or less than may be used, but this is merely a description for expressing an example, and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A to B' may refer, for example, to at least one of elements from A (including A) and to B (including B).

The present disclosure relates to an electronic device and a method for enhancing performance of a digital predistortion (DPD) circuit that compensates for non-linearity of a power amplifier (PA) in a wireless communication system. For example, in the wireless communication system, the present disclosure may improve performance of a transmitting end by compensating a distortion component of the power amplifier through at least a part of DPD units of a DPD circuit selected, based on the amount of resource allocated within bandwidth.

FIG. 1 is a diagram illustrating a wireless communication system according to embodiments.

Referring to FIG. 1, FIG. 1 illustrates a base station 110 and a terminal 120 as a part of nodes using a wireless channel in the wireless communication system. FIG. 1 illustrates only one base station, but the wireless communication system may further include another base station that is the same as or similar to the base station 110.

The base station 110 is a network infrastructure that provides wireless access to the terminal 120. The base station 110 has coverage defined based on a distance capable of transmitting a signal. The base station 110 may be referred to as access point (AP), eNodeB (eNB), generation node, next generation nodeB (gNB), wireless point, transmission/reception point (TRP), or another term having an equivalent technical meaning, other than the base station.

The terminal 120 is a device used by a user and performs communication with the base station 110 through the wireless channel A link from the base station 110 to the terminal 120 is referred to as a downlink (DL), and a link from the terminal 120 to the base station 110 is referred to as an uplink (UL). In addition, although not illustrated in FIG. 1, the terminal 120 and another terminal may perform communication through the wireless channel. In this case, a device-to-device link (D2D) between the terminal 120 and another terminal is referred to as a sidelink, and the sidelink may be used with the PC5 interface by mixing. In an embodiment, the terminal 120 may be operated without user involvement. According to an embodiment, the terminal 120 is a device that performs machine type communication (MTC) and may not be carried by the user. In addition, according to an embodiment, the terminal 120 may be a narrowband (NB)-Internet of things (IoT) device.

The terminal 120 may be referred to as user equipment (UE), customer premises equipment (CPE), mobile station, subscriber station, remote terminal, wireless terminal, electronic device, user device, or another term having an equivalent technical meaning, other than the terminal.

As the power of an input signal of a power amplifier (PA) increases, the response of the power amplifier indicates non-linearity. The response of the power amplifier eventually reaches a saturation point. This non-linearity induces distortion in a transmitted signal and causes deterioration of link quality. Thus, linearity of the power amplifier is required. Generally, to achieve the linearity, it is required that the power amplifier be input within a limited power range. Digital pre-distortion may be used to increase the power range of the input signal for the linearity.

Figure 2:
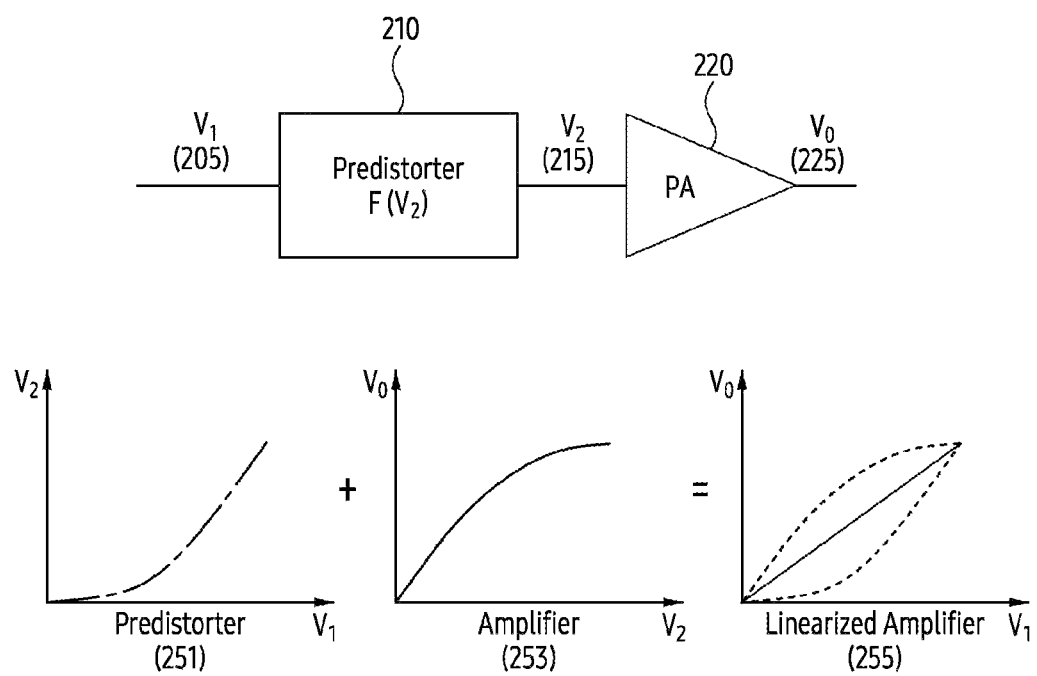
FIG. 2 is a diagram illustrating a principle of digital predistortion (DPD) according to embodiments.

FIG. 2 is a diagram illustrating the principle of digital predistortion (DPD) according to embodiments. Pre-distortion may be performed in a DPD circuit. The DPD circuit compensates for a distortion component due to a non-linear characteristic of a PA based on comparison between an input signal and an output signal of the power amplifier (PA). As an input modulation signal distorted through the DPD circuit is input to the PA, a finally modulated signal may be linearly amplified.

Referring to FIG. 2, a DPD circuit 210 may output a DPD output signal 215 based on an input signal 205. The input signal 205 may be pre-distorted to the DPD output signal 215 through the DPD circuit 210. A PA 220 may output an amplifier output signal 225 based on the DPD output signal 215. The DPD output signal 215 may be input to the PA 220. Due to the non-linear characteristic of the PA 220, the DPD output signal 215 is distorted. The amplifier output signal 225 is output by the distortion due to the PA 220. Although not illustrated in FIG. 2, analog conversion may be performed on the DPD output signal 215 through a DAC, and upward conversion may be performed on the DPD output signal 215 through a mixer.

A graph 251 shows a relationship between a size of the input signal 205 and a size of the DPD output signal 215. A graph 253 shows a relationship between a size of the DPD output signal 215 and a size of the amplifier output signal 225. A graph 255 shows a relationship between a size of the input signal 205 and a size of the amplifier output signal 225. Referring to graph 255, through the pre-distortion of the DPD circuit 210, an output (e.g., the amplifier output signal 225) in respect to an input (e.g., the input signal 205) may be linear.

The PA 220 may include a transistor. The transistor generates a harmonic component. Due to non-linearity of a low-frequency secondary harmonic component corresponding to a bandwidth (f2-f1) (f2 is the highest frequency and f1 is the lowest frequency), a memory effect occurs. The larger the low-frequency secondary harmonic component is, the more difficult it is to remove impedance. Thus, the power amplifier exhibits the memory effect as a signal bandwidth increases. In case that a modulation signal of a wireless communication system is used as a wide bandwidth signal, the distortion component of the power amplifier may include the distortion component due to the memory effect as well as the non-linear characteristic. The memory effect may refer, for example, to a signal generated non-linearly in the past in time affecting the current non-linearity. In other words, the power amplifier is a non-linear system using a memory.

The memory effect may be attributed to thermal constants of active devices or components of a biasing network having frequency-dependent operation. As described above, the distortion component due to the memory effect increases in proportion to the bandwidth of the signal. A memory compensated DPD circuit is required to compensate for both the non-linear distortion component of the power amplifier and the distortion component by the memory effect. Hereinafter, FIG. 3 describes the memory compensated DPD circuit.

Figure 3:
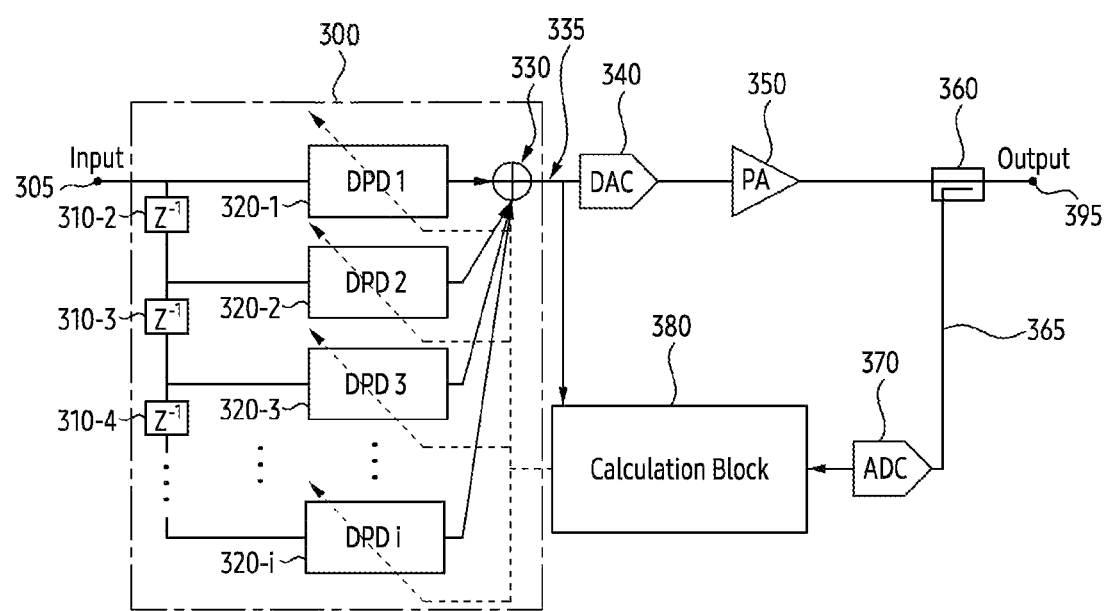
FIG. 3 is a diagram illustrating an example of a transmission circuit including a DPD circuit according to embodiments.

FIG. 3 is a diagram illustrating an example of a transmission circuit including a DPD circuit according to embodiments. The DPD circuit according to embodiments may compensate for a memory effect. The memory effect may refer, for example, to a signal generated in the past in time affecting the current non-linearity.

Referring to FIG. 3, a DPD circuit 300 may use a finite impulse response (FIR) filter structure. For implementation of the pre-distortion, a multi-order FIR filter may be used. The DPD circuit 300 may include components according to the structure of the FIR filter. The DPD circuit 300 may include a plurality of DPD units, one or more delay elements, and a combiner 330. The plurality of DPD units may include a first DPD unit 320-1, a second DPD unit 320-2, a third DPD unit 320-3 . . . , an i-th DPD unit 320-i. In each DPD unit, a function operation (e.g., multiplication of a coefficient) for a delayed signal may be performed. The i may correspond to a length of the FIR filter. The one or more delay elements may include a second delay element 310-2 connected to the second DPD unit 320-2, a third delay element 310-3 connected to the third DPD unit 320-3, a fourth delay element 310-4 connected to a fourth DPD unit 320-4, . . . , and a delay element coupled to a Nth DPD unit. Output of each DPD unit of the plurality of DPD units may be provided to the combiner 330.

The combiner 330 may generate a DPD output signal 335 by combining the output of the plurality of DPD units. The DPD output signal 335 may be transmitted from the combiner 330 to a DAC 340. According to an embodiment, the DPD output signal 335 may be provided to a calculation block 380. The calculation block 380 may refer, for example, to a function performed by a processor.

The DAC 340 may convert the DPD output signal 335 into an analog signal. The DAC 340 may transmit the converted analog signal to a PA 350. Although not illustrated in FIG. 3, up-conversion by a mixer may be performed between the DAC 340 and the PA 350.

The PA 350 may amplify an input signal. A signal 395 amplified by the PA 350 may pass through a coupler 360 and may be transmitted to a filter (not illustrated) (e.g., a bandpass filter (BPF), and an antenna (not illustrated). The antenna may radiate the signal. Meanwhile, the PA 350 may include a transistor. The transistor is an active element and has an inherently non-linear characteristic. Thus, the PA 350 may output an amplifier output signal that is non-linear in respect to the input signal. The amplifier output signal is linearly proportional to the input signal in some area in respect to a size of the input signal. However, in some other area in respect to the size of the input signal, the PA 350 provides an output that is not proportional to the input signal. In particular, the wider a bandwidth of the input signal of the PA 350, the more frequently the memory effect occurs due to a secondary harmonic component of the input signal. A harmonic impedance of an output end of the PA 350 may generate a voltage component. The voltage component may be reflected by a bias line and re-input to the PA 350. Thus, the memory effect may occur through an interaction between a current input signal and a re-input signal. In order to reduce performance delay due to the memory effect, the DPD circuit 300 and the calculation block 380 for controlling the DPD circuit 300 may be used.

The calculation block 380 may control the DPD circuit 300 to pre-distort the non-linear characteristic of the PA 350. Calculations corresponding to the calculation block 380 may be performed by the processor. In other words, the processor of an electronic device may generate a control signal for controlling the DPD circuit 300.

According to an embodiment, the processor of the calculation block 380 may determine how much to compensate for the non-linear characteristic of the PA 350 through the DPD circuit 300 based on the bandwidth of the input signal. As the complexity of the DPD circuit 300 increases, the degree of compensation of the non-linear characteristic of the PA 350 increases. The complexity of the DPD circuit 300 depends on the number of activated DPD units. The number of the activated DPD units may be referred to as a memory order.

According to an embodiment, the processor of the calculation block 380 may determine control parameters for pre-distorting the non-linear characteristic of the PA 350 by comparing the input signal of the PA 350 with an output signal of the PA 350. Determining the control parameters may be referred to as DPD modeling. The processor of the calculation block 380 may obtain an input signal to the DAC 340. The input signal to the DAC 340 may correspond to the input signal of the PA 350. The processor of the calculation block 380 may obtain an output signal of an ADC 370. The output signal of the ADC 370 may correspond to the output signal of the PA 350. A signal 365 isolated through the coupler 360 coupled to the PA 350 may pass through the ADC 370 and may be transmitted to the calculation block 380.

The DPD circuit 300 may include a DPD unit DPD1 (e.g., the first DPD unit 320-1) for a current input signal 305 and DPD units DPD2, DPD3, DPDi (e.g., the second DPD unit 320-2, the third DPD unit 320-3, . . . , the i-th DPD unit 320-*i*) for a past signal. As the bandwidth increases and an output power of the PA 350 increases, a distortion component increases. In order to linearize the output signal at rated output power, the DPD circuit 300 having a relatively complex structure is required. The rated output power is the output power when a resource for terminal users is allocated to the maximum, in other words, when traffic is the highest. In an orthogonal frequency-division multiplexing (OFDM) modulation method, resource blocks (RBs) may be allocated according to traffic. At the rated output power, all the RBs of a channel operating in a base station are allocated. In other words, at the rated output power, the base station transmits signals corresponding to the maximum bandwidth. If the number of the terminal users decreases and the traffic decreases, the output power and bandwidth decrease. In addition, a distortion characteristic of the PA 350 are also improved, and the complex structure of the DPD circuit required for rated output needs to be simplified.

If there is no change in the complexity of the DPD according to the bandwidth of the output signal, the DPD circuit always operates at a complexity suitable for the rated output power. When a high complexity DPD circuit (e.g., all of a plurality of DPD units operate) is used in a low traffic situation, it is difficult to properly model DPD for frequency band of RBs that are not allocated within the base station operating channel. At this time, in case that maximum traffic is allocated to a transmission system, distortion of the output signal instantaneously occurs. Here, the distortion may refer, for example, to distortion of the DPD output, not pre-distortion for compensating for non-linearity. Since wireless communication quality is degraded due to additional distortion (e.g., distortion other than pre-distortion) generated in the DPD output, a method for maintaining performance of improving linearity due to the DPD circuit is required.

Embodiments of the present disclosure provide a method for differently operating the complexity of the DPD circuit according to a bandwidth of an input signal of a wireless communication system. In low traffic, a modeling error of the DPD circuit for unallocated frequency resources in the channel may be reduced, and in high traffic, performance of the transmission circuit may be improved through the DPD circuit that compensates for the distortion component of the intact PA. Hereinafter, in FIG. 4, an example of the transmission circuit for DPD control using an allocated resource is described in greater detail.

Figure 4:
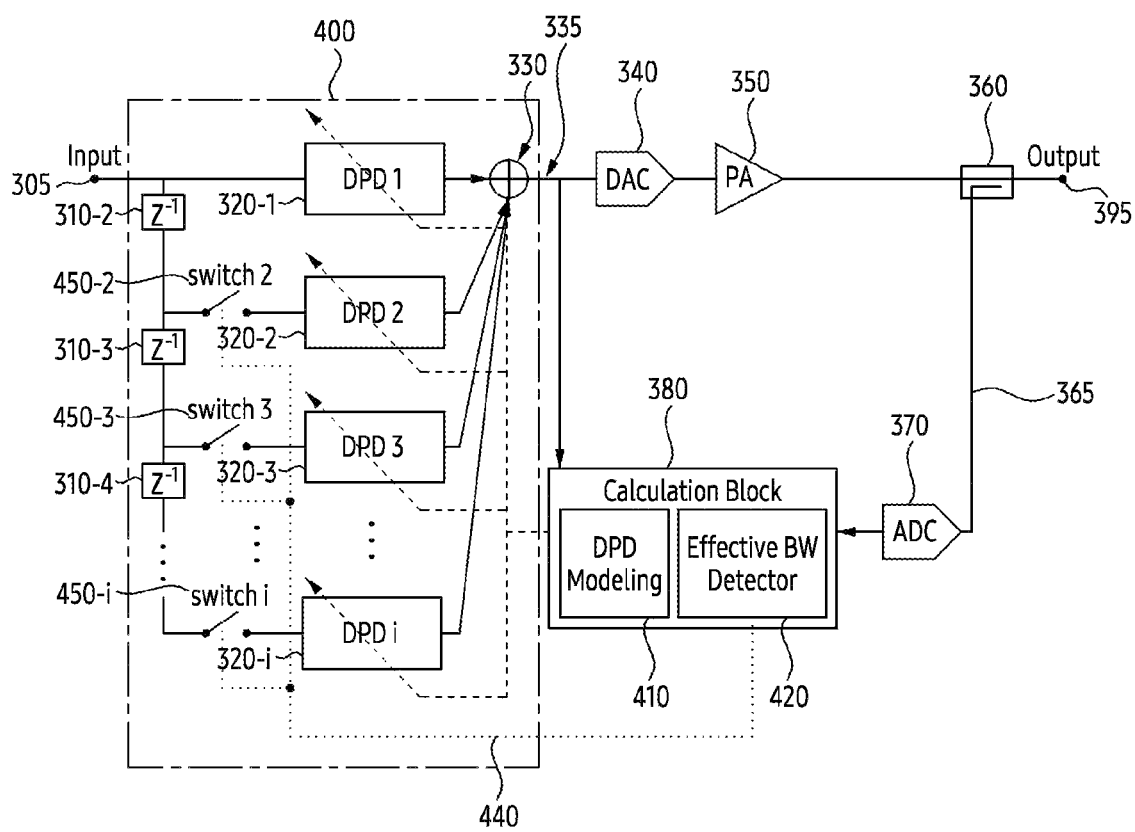
FIG. 4 is a diagram illustrating an example of a transmission circuit including a DPD circuit according to DPD control based on resource allocation according to embodiments.

FIG. 4 is a diagram illustrating an example of a transmission circuit including a DPD circuit according to DPD control based on resource allocation according to embodiments. The transmission circuit of FIG. 4 may use the transmission circuit of FIG. 3. A DPD circuit 400 of the transmission circuit of FIG. 4 may include at least a part of component of a DPD circuit 300 of FIG. 3. In addition, terms such as '. . . portion', '. . . er', '. . . structure', '. . . construction', used below may refer, for example, to at least one shape structure or a unit that processes a function.

Referring to FIG. 4, the DPD circuit 400 may use a finite impulse response (FIR) filter structure. The DPD circuit 400 may include a plurality of DPD units, one or more delay elements, one or more switches, and a combiner 330. The plurality of DPD units may include a first DPD unit 320-1, a second DPD unit 320-2, a third DPD unit 320-3 . . . , an i-th DPD unit 320-*i*. The 'i' may correspond to a length of a FIR filter. The order of the FIR filter is 'i-1'. The one or more delay elements may include a second delay element 310-2 connected to the second DPD unit 320-2, a third delay element 310-3 connected to the third DPD unit 320-3, a fourth delay element 310-4 connected to a fourth DPD unit 320-4, . . . , and a delay element coupled to a Nth DPD unit. The one or more switches may include a second switch 450-2 connected to the second DPD unit 320-2, a third switch 450-3 connected to the third DPD unit 320-3, and a fourth switch 450-4 connected to the fourth DPD unit 320-4, . . . , and a switch 450-*i* coupled to the Nth DPD unit. Output of each DPD unit of the plurality of DPD units may be provided to the combiner 330.

The combiner 330 may generate a DPD output signal 335 by combining the output of the plurality of DPD units. The DPD output signal 335 may be transmitted from the combiner 330 to a DAC 340. According to an embodiment, the DPD output signal 335 may be provided to a calculation block 380. The calculation block 380 may refer, for example, to a function performed by a processor. Hereinafter, an operation of the calculation block 380 for effective bandwidth based DPD control according to various embodiments may be understood as an operation of the processor.

The DAC 340 may convert the DPD output signal 335 into an analog signal. The DAC 340 may transmit the converted analog signal to a PA 350. Although not illustrated in FIG. 3, up-conversion by a mixer may be performed between the DAC 340 and the PA 350.

The PA 350 may amplify an input signal. A signal 395 amplified by the PA 350 may pass through a coupler 360 and may be transmitted to a filter (not illustrated) (e.g., a bandpass filter (BPF), and an antenna (not illustrated). The antenna may radiate the signal. Meanwhile, the PA 350 may include a transistor.

The processor may control the DPD circuit 400 to pre-distort a non-linear characteristic of the PA 350 through the calculation block 380. The DPD circuit 400 may compensate a signal input to the PA 350 in advance. The calculation block 380 may include a DPD modeling unit 410 and an effective bandwidth detector 420, each of which may include various processing circuitry and/or executable program instructions. The processor may generate a control signal 440 for controlling the DPD circuit 400. Wide bandwidth generally has a high memory effect. However, even if the bandwidth is wide, if actually allocated resources are small, for signals allocated to a small resource, a high-complexity DPD circuit is disadvantageous in terms of efficiency. In addition, in other words, when many resources are allocated instantaneously, since a coefficient applied to each DPD unit is not changed, components for previous signals are applied to the DPD circuit for memory compensation, causing distortion in an output signal. Thus, among the DPD circuits, it is required to deactivate the DPD unit related to an unnecessary past component.

The calculation block 380 according to various embodiments may include the effective bandwidth detector 420 for DPD modeling. The effective bandwidth detector 420 may calculate an effective bandwidth based on the input signal. The effective bandwidth may refer, for example, to a size of a frequency resource allocated in a frequency domain. The effective bandwidth detector 420 may calculate the effective bandwidth based on a Fast Fourier Transform (FFT). The effective bandwidth detector 420 of the processor may determine how much to compensate for the non-linear characteristic of the PA 350 through the DPD circuit 400 based on the bandwidth of the input signal. As the complexity of the DPD circuit 400 increases, the degree of compensation of the non-linear characteristic of the PA 350 increases. The complexity of the DPD circuit 400 depends on the number of activated DPD units. The number of the activated DPD units may be referred to as a memory order.

The DPD modeling unit 410 of the processor may determine control parameters for distorting the non-linear characteristic of the PA 350 in advance by comparing the input signal of the PA 350 with the output signal of the PA 350. Determining the control parameters may be referred to as the DPD modeling. The calculation block 380 may obtain an input signal to the DAC 340. The input signal to the DAC 340 may correspond to the input signal of the PA 350. The calculation block 380 may obtain an output signal of an ADC 370. The output signal of the ADC 370 may correspond to the output signal of the PA 350. A signal 365 isolated through the coupler 360 coupled to the PA 350 may pass through the ADC 370 and may be transmitted to the calculation block 380.

The DPD modeling unit 410 according to embodiments may calculate modeling parameters reflected in the DPD circuit 400. The modeling parameters may include a function (or the coefficient) applied to each DPD unit of the DPD circuit 400. The DPD modeling unit 410 may model non-linearity of the PA 350 by comparing the signal input to the PA 350 with a signal fed back through an output of the PA 350 and a coupler. The modeling result may be reflected in DPD units activated as much as the memory order. The activated DPD units may compensate for a distortion component of the PA 350.

The DPD modeling unit 410 according to embodiments may calculate non-linear modeling parameters for the PA 350. Each DPD unit may apply a function $f_i(k)$ corresponding to the specific time delay to an input component (e.g., $x(n-i)$) corresponding to the specific time delay i.

According to an embodiment, the function may be determined based on the number of components for the non-linear modeling of the PA 350. In this case, the number of components for the non-linear modeling may be reduced through the resource allocation based DPD control according to embodiments. The meaning of decrease may refer, for example, to the number of components for expressing the non-linear model being smaller than components used for rated power (e.g., maximum bandwidth). For example, it may be a polynomial. The function may include a plurality of terms. In this case, the number of terms of the function may be reduced compared to the number of terms used for the rated power. For example, if the function for the DPD unit at rated power was a quintic polynomial, the function for the DPD unit at effective bandwidth may be a third-degree polynomial. In this way, as the complexity of the function applied to the DPD unit decreases, the calculation speed may increase. The complexity of the function depends on the modeling of the power amplifier (e.g., the PA 350). For example, the higher the complexity, the larger the number of terms configuring the polynomial that is the function. The lower the complexity, the smaller the number of terms configuring the polynomial.

The processor may determine the memory order of the DPD circuit according to the calculated effective bandwidth. The processor may determine the memory order based on a ratio (hereinafter, an allocation ratio) of the effective bandwidth in respect to the entire bandwidth (e.g., channel bandwidth, transmission bandwidth). The memory order may refer, for example, to the number of DPD units to be activated among the plurality of DPD units of the DPD circuit 400. In case that one DPD unit is activated, the memory order of the DPD circuit 400 is 1. In case that two DPD units are activated, the memory order of the DPD circuit 400 is 2. In case that three DPD units is activated, the memory order of the DPD circuit 400 is 3.

According to an embodiment, the allocation ratio may be determined based on the number of samples having a power spectral density (PSD) exceeding a threshold through the FFT. Each sample may correspond to a resource element (RE) in the frequency domain. An RB defining a resource allocation unit may be defined as $N_{SC}^{RB}$ consecutive subcarriers in the frequency domain. The number of subcarriers may be $N_{SC}^{RB}=12$. For example, the allocation ratio may be determined based on the following equation.

$$BW_{eff} = \text{count}(X_{psd} > Th)/\text{FFT Size} \times \text{Sampling Rate}/\text{Operating Channel BW} \quad \text{[Equation 1]}$$

Here, $BW_{eff}$ may refer, for example, to an allocation ratio of the effective bandwidth. $X_{psd}$ being a value obtained by calculating the power spectral density (PSD) by FFT the input signal. Th is the threshold of the PSD for determining the effective bandwidth. The processor may count the number of sample of $X_{psd}$ exceeding the set threshold value according to an operation state of a transmission system of a base station.

The processor may calculate the allocation ratio by multiplying a ratio of the number of samples greater than the threshold in respect to the total FFT size and ratio of signal sampling rate and base station operating channel BW. In other words, $BW_{eff}$ represents ratio of currently allocated RB within the base station operating channel BW.

The processor may determine whether each DPD unit is active in a section distinguished according to the $BW_{eff}$ value. The control signal 440 of the processor may indicate activation or deactivation of each DPD unit. For example, the processor may transmit the control signal 440 for turning on or off each of the switches connected to the DPD units. By controlling the switch, the processor may change a structure of the DPD circuit 400. The structure of the DPD circuit 400 may vary depending on the number of the activated DPD units among the plurality of DPD units of the DPD circuit 400. For example, the processor may change the structure of the DPD circuit 400 based on the following equation.

Range 1: $BW_{eff}=0\sim0.5 \rightarrow$ All switch turn off $\rightarrow f_0(x(n))$ Range 2: $BW_{eff}=0.5\sim0.8 \rightarrow$ switch$_1\sim$switch$_j$ turn on $\rightarrow f_0(x(n))+f_1(x(n-1))+\ldots+f_j(x(n-j))$ Range 3: $BW_{eff}=0.8\sim1.0 \rightarrow$ All switch turn on $\rightarrow f_0(x(n))+f_1(x(n-1))+\ldots+f_i(x(n-i))$ [Equation 2]

Here, $f_i(x(n-i))$ represents a function provided in the DPD unit corresponding to the i-th memory order. For example, the function may include a polynomial operation (e.g., an operation that multiplies an input by a specific coefficient, an operation that adds terms). The DPD unit may output an operation result.

In case that the effective bandwidth is small, the DPD circuit 400 does not compensate for memory. Since it is not modeled for an unallocated frequency band within the operating channel, the output signal is not distorted even if maximum traffic is instantaneously allocated. Here, that the output signal is not distorted indicates that unintended distortion does not occur in the pre-distortion by the DPD circuit 400.

As the effective bandwidth increases, unallocated frequency resources within the operating channel decrease. As the effective bandwidth increases, the transmission circuit uses the DPD circuit having increasingly higher complexity. The DPD circuit having high complexity may refer, for example, to the complexity of a function of the DPD unit designed for the non-linear modeling in the time delay being high. For example, the complexity of the polynomial may refer to the maximum degree of the polynomial. According to embodiments, by designing DPD modeling based on the effective bandwidth rather than maximum channel bandwidth, the number of components of a function of an individual DPD unit (e.g., the degree of a polynomial) may decrease.

The transmission circuit may use the largest number of DPD units, in other words, the DPD circuit 400 according to the largest memory order, in a maximum traffic situation in which the distortion component of the PA 350 is maximized, in other words, at rated output.

According to an embodiment, the number of sections and the range in each section distinguished according to the ratio of the effective bandwidth in respect to the entire bandwidth may vary based on the characteristic of the PA 350. The number of the sections and the range in each section may be determined according to the memory effect of the PA 350 and the characteristics defining the non-linearity. According to the non-linearity modeling of the PA 350, the number of components of the function applied in the DPD unit and the coefficients of each component may be determined. In addition, according to an embodiment, the PSD threshold used for calculating the effective bandwidth may vary depending on the characteristic of the PA 350 and the operating scenario of the base station transmission system.

Figure 5A:
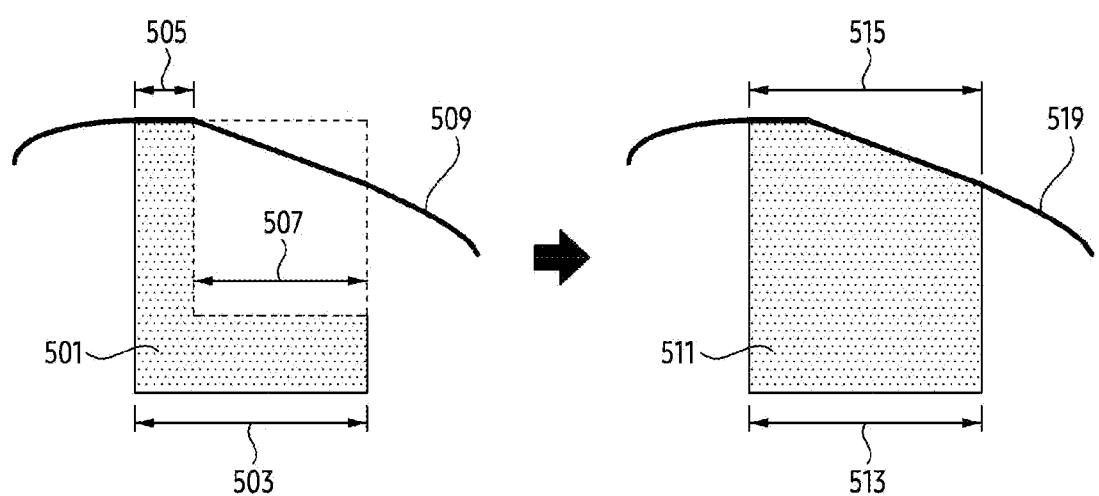
FIGS. 5A and 5B are graphs illustrating examples of performance of resource allocation based DPD control according to embodiments.
Figure 5B:
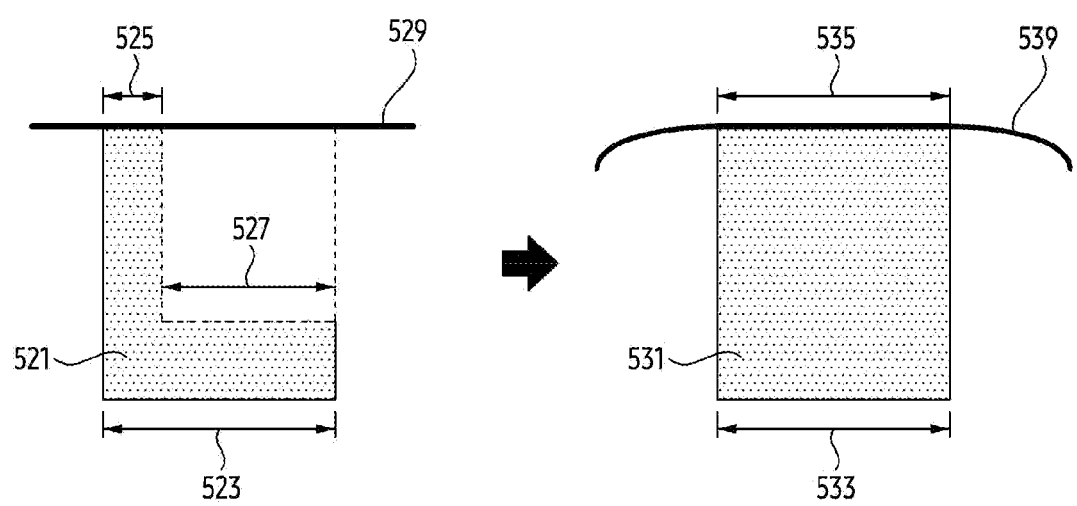

FIGS. 5A and 5B are graphs illustrating examples of performance of resource allocation based DPD control according to embodiments. In FIG. 5A, a result of pre-distortion without the resource allocation-based DPD control is described, and in FIG. 5B, a result of pre-distortion using the resource allocation-based DPD control is described.

Referring to FIG. 5A, a bandwidth 503 of an output signal 501 may include an allocated resource area 505 and an unallocated resource area 507. A bandwidth 513 of an output signal 511 may include an allocated resource area 515. All RBs of the bandwidth 513 of the output signal 511 may be allocated.

A DPD circuit without the resource allocation based DPD control may perform the pre-distortion based on all DPD units. Each DPD unit may compensate for a memory effect of a power amplifier through different delay time. All the DPD units and delay elements of the DPD circuit are used for the pre-distortion. However, a secondary harmonic component affecting the memory effect is affected by a size of the allocated frequency. In other words, if the actual allocated frequency size is small, the DPD circuit does not need to use all the DPD units configured for an entire bandwidth. Rather, the DPD unit for compensation of the past component may generate the unnecessary pre-distortion.

A DPD model characteristic 509 of the output signal 501 (e.g., in a frequency domain, the relationship of the output signal to an input signal of the DPD circuit) is constant in the allocated resource area 505. However, the DPD model characteristic 509 decreases in the unallocated resource area 507. In the unallocated resource area 507, there is no need to improve the linearity of the power amplifier, but if resources are allocated to an entire bandwidth 513 instantaneously, it is difficult for the DPD circuit to accurately provide the pre-distortion for the entire bandwidth 513. A DPD model characteristic 519 of the output signal 511 is not constant in the allocated resource area 515. Since the DPD circuit does not sufficiently reflect the memory effect for the additionally allocated frequency part, the performance of the entire transmission circuit is degraded.

Referring to FIG. 5B, a bandwidth 523 of an output signal 521 may include an allocated resource area 525 and an unallocated resource area 527. A bandwidth 533 of an output signal 531 may include an allocated resource area 535. All RBs of the bandwidth 533 of the output signal 531 may be allocated.

The DPD circuit using the resource allocation based DPD control may perform the pre-distortion based on at least a part of the DPD unit among all the DPD units. At least the part of DPD units may compensate for the memory effect of the power amplifier through the different delay time. If the actual allocated frequency size is small, the DPD circuit does not need to use all the DPD units configured for the entire bandwidth. To compensate for a small memory effect, instead of providing a coefficient to each of all the DPD units, the processor may activate at least the part of DPD unit among the DPD units and may deactivate the remaining DPD unit. The processor may deactivate at least one DPD unit so that the unnecessary pre-distortion does not occur.

A DPD model characteristic 529 of the output signal 521 (e.g., in the frequency domain, the relationship of the output signal in respect to the input signal of the DPD circuit) is constant in the allocated resource area 525. The DPD model characteristic 529 is constant in the unallocated resource area 527. Since memory compensation for the unallocated resource area 527 is not performed, distortion of the output signal may not occur even in a situation in which resource is instantaneously allocated to the entire bandwidth 533. In other words, the pre-distortion performance of the DPD circuit may be guaranteed. A DPD model characteristic 539 of the output signal 531 is constant in the allocated resource area 535. Through switch control of the DPD circuit of the processor, compensation for an unnecessary memory effect, which may cause an error in the added frequency domain, is not performed, so the performance of the entire transmission circuit may be maintained.

As described through FIGS. 1, 2, 3, 4, 5A and 5B, a harmonic component corresponding to the bandwidth cause non-linearity of the power amplifier. Thus, if the size of the frequency domain used is small, the memory effect generated in the power amplifier is insignificant. Even though a relatively small frequency domain is used within the bandwidth, if the DPD circuit is used as it is, it is difficult to properly design parameters for the part of DPD units reflecting the past time. For example, in case that a channel bandwidth is 20 MHz, the maximum number of allocable RBs is 100. When RBs fewer than 50 are allocated, the memory effect of the power amplifier may be relatively insignificant. The DPD circuit may not use the delay element and the DPD unit for compensation of the past component. Nevertheless, if a function is designed based on unnecessary time delay components, when RBs of a number exceeding 50 (e.g., 100) are instantaneously allocated, the output of the DPD circuit causes unnecessary distortion.

A processor of an electronic device (e.g., a base station 110 of FIG. 1) may include various processing circuitry and calculate an effective bandwidth of the input signal. The processor of the electronic device may determine a memory order of the DPD circuit based on the effective bandwidth. The memory order of the DPD circuit may refer, for example, to the number of activated DPD units among a plurality of DPD units of the DPD circuit. Activation of the DPD unit may be determined according to ON or OFF of a switch disposed between the DPD unit and the delay element. The DPD unit (e.g., a first DPD unit 320-1) for the current time may always be activated regardless of the switch. By performing pre-distortion using at least a part of the DPD unit based on the effective bandwidth, as the modeling is incorrect for the frequency interval in the operating channel to which RBs are not allocated at a specific time, the overfitting problem can be solved. In summary, at rated output (e.g., high traffic), a high complexity DPD circuit may well compensate for the distortion characteristics of the PA. In low traffic, a low complexity DPD circuit reduces the calculation time for pre-distortion, so the convergence speed is improved. Thus, the processor may be modeled by rapidly responding to changes in the temperature, signal, environment, and the like of the power amplifier.

The transmission circuit described in FIGS. 3 and 4 may include the DPD circuit and a calculation block. A time unit compensated by the DPD circuit (e.g., $Z^{-1}$ of FIG. 3 and $Z^{-1}$ of FIG. 4) may be independent of a time unit at which the processor of the calculation block calculates the functions of the DPD circuit. For example, a delay unit (e.g., $Z^{-1}$ of FIG. 3 and $Z^{-1}$ of FIG. 4) of the memory compensation due to the time delay of the DPD circuit and an update unit of the function (e.g., a function corresponding to each tap) determined by comparing input and output of the power amplifier may have different synchronization. For another example, the delay unit (e.g., $Z^{-1}$ of FIG. 3 and $Z^{-1}$ of FIG. 4) of the memory compensation due to the time delay of the DPD circuit may have the same synchronization as the update unit of the function determination (e.g., coefficient determination per term of a polynomial) of the DPD circuit.

According to an embodiment, the processor may calculate an allocated resource within the bandwidth, in other words, the effective bandwidth. According to an embodiment, the implementation of the DPD circuit of the present disclosure may be confirmed by identifying that the memory order, that is, the number of the activated DPD units is changed as a resource allocated within a given bandwidth is changed.

According to an embodiment, the implementation of the DPD circuit of the present disclosure may be confirmed by identifying that non-linear model of the DPD, that is, the function (e.g., coefficient per term) applied to each DPD unit of the activated DPD units is changed as the resource allocated within the given bandwidth is changed.

According to an embodiment, the implementation of the DPD circuit of the present disclosure may be confirmed by identifying that the number of activated DPD units and the components of the function applied to each DPD unit of activated DPD units (e.g., the number of terms in a polynomial, the coefficient per term) being changed as the resource allocated within the given bandwidth is changed.

According to an embodiment, the DPD circuit for memory compensation may include the switch disposed between each delay element and the DPD unit.

According to an embodiment, the processor may change the number of DPD modeling complexity sections and the range of each of the sections based on the effective bandwidth.

Figure 6:
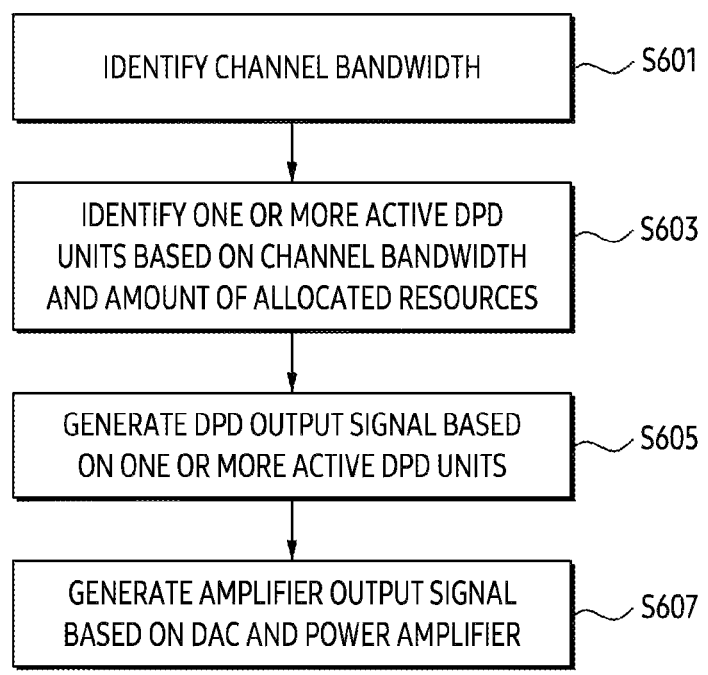
FIG. 6 is a flowchart illustrating an example operation of an electronic device for resource allocation based DPD control according to embodiments.

FIG. 6 is a flowchart illustrating an example operation of an electronic device for resource allocation based DPD control according to embodiments. The operations of the electronic device may be performed by a processor or a communication device (e.g., DPD, DAC, PA) equipped in the electronic device.

Referring to FIG. 6, in operation S601, the electronic device may identify a channel bandwidth. The channel bandwidth may be a maximum allocatable frequency size. When transmitting a signal using the entire channel bandwidth, the electronic device consumes rated output power. At the rated output power, all RBs of a channel operating in the electronic device are allocated. According to an embodiment, the channel bandwidth may refer to an interval between a start point and an end point of an operating channel. For example, the channel bandwidth may be 100 MHz. For another example, the channel bandwidth may be 20 MHz. According to an embodiment, the channel bandwidth may refer to a frequency domain corresponding to the maximum number of allocable RBs.

In operation S603, the electronic device may identify one or more active DPD units based on the channel bandwidth and the amount of allocated resources. The electronic device may identify a size of the amount of allocated resource. The amount of allocated resource may refer, for example, to a size of frequency resources to be used for actual transmission among frequency resources within the channel bandwidth. The amount of allocated resource may refer, for example, to the frequency domain corresponding to allocated RBs within the channel bandwidth. The amount of allocated resource may be referred to as transmission bandwidth, active bandwidth, or effective bandwidth.

The electronic device may calculate an effective bandwidth ratio based on the channel bandwidth and the amount of allocated resource. The effective bandwidth ratio may refer, for example, to the total allocated resources in respect to the channel bandwidth. How many frequency resources are used, in other words, the size of the bandwidth of a signal input to a power amplifier, affects the degree of memory effect. Thus, the electronic device may change the configuration of a DPD circuit based on the effective bandwidth ratio.

The electronic device may identify the one or more active DPD units among a plurality of DPD units of the DPD circuit of a transmission circuit based on the effective bandwidth ratio. The DPD circuit may include one or more delay elements and the DPD unit connected to each delay element to compensate for the memory effect. A memory order may be K (K≤N, N is the number of total DPD units). The memory order may be determined based on the effective bandwidth ratio. According to an embodiment, the electronic device may determine the memory order based on the effective bandwidth ratio. The electronic device may identify K fast DPD unit(s) in chronological order among the plurality of DPD units. For example, the kth DPD unit may correspond to the operation of $f_j(x(n-k+1))$ (Here, k is an integer greater than or equal to 1 and less than or equal to K.). According to an embodiment, the electronic device may determine the memory order corresponding to a range to which the effective bandwidth ratio belongs. For example, as shown in Equation 2, when the effective bandwidth ratio is less than the first threshold (e.g., 0.5), the electronic device may perform pre-distortion using only the DPD unit for the current input without using a separate delay element. In this case, the memory order may be 1. Meanwhile, when the effective bandwidth ratio is greater than or equal to the first threshold (e.g., 0.5) and less than the second threshold, the electronic device may perform the pre-distortion based on a predetermined number (e.g., j) of DPD units. In this case, the memory order may be j.

In operation S605, the electronic device may generate a DPD output signal based on the one or more active DPD units. In case that a structure of the current DPD circuit according to the active state (e.g., active or inactive) of each DPD unit is different from a structure according to the identified one or more DPD unit and other DPD unit, the electronic device may generate a control signal for changing a DPD circuit structure. The electronic device may transmit the generated control signal to the DPD circuit.

The electronic device may activate the one or more active DPD units of the DPD circuit. The electronic device may provide the control signal for activating each DPD unit of the one or more active DPD units to the DPD circuit. According to an embodiment, the electronic device may use one control signal for activating each DPD unit of the one or more active DPD units. According to an embodiment, the electronic device may use the individual control signal for activating the DPD units, respectively.

The electronic device may deactivate at least one DPD unit different from the one or more active DPD units among the plurality of DPD units of the DPD circuit. The electronic device may provide the control signal for inactivating each DPD unit of the one or more active DPD units to the DPD circuit. According to an embodiment, the electronic device may use one control signal for inactivating each DPD unit of the one or more active DPD units. According to an embodiment, the electronic device may use the individual control signal for inactivating the DPD units, respectively.

The electronic device may determine a function for the active DPD unit. The electronic device may provide information related to the function to be applied in the active DPD unit to each active DPD unit. Determining the function of each DPD unit may be referred to as DPD modeling. The DPD modeling may be performed based on non-linearity of the power amplifier. The electronic device may obtain an input signal of the power amplifier in order to specify the non-linearity of the power amplifier. The input signal may be a digital signal. The electronic device may obtain a signal input to the DAC. The electronic device may obtain an output signal of the power amplifier in order to specify the non-linearity of the power amplifier. The output signal may be fed back through a coupler connected to an end of the power amplifier. The signal which is fed-back may pass through the ADC and may be converted into a digital signal. The electronic device may determine the function (e.g., the number of terms and a coefficient of a polynomial) for compensation and the pre-distortion of the memory effect by comparing the input signal and the output signal of the power amplifier. An operation according to the function may be performed in a DPD unit corresponding to a specific time component.

In operation S605, the electronic device may generate the DPD output signal based on the one or more active DPD units. The DPD circuit of the transmission circuit may include the plurality of DPD units. Each DPD unit corresponds to a different time delay. The DPD circuit may include an FIR filter. Each tab of the FIR filter may refer, for example, to a corresponding DPD unit of the plurality of DPD units. The electronic device may reach convergence in a faster time by generating the DPD output signal using the one or more active DPD units instead of generating the DPD output signal using all DPD units. The convergence may refer, for example, to a state in which the memory effect and non-linear characteristic of the power amplifier are maximally compensated through calculations of a plurality of DPD coefficient. As the fewer DPD unit is used, the amount of coefficients that the processor has to calculate is reduced. Thus, since the time required for the processor to calculate the DPD coefficient once is reduced, the time to reach convergence is shortened.

In operation S607, the electronic device may generate an amplifier output signal based on the DAC and the power amplifier. The output of the DPD circuit may be input to the DAC. The DAC may output an analog signal by converting the input signal. The analog signal, which is the output of the DAC, may be input to the power amplifier through up-conversion. The electronic device may generate the output signal by providing the DPD output signal, which is the output of the DPD circuit, to the DAC and the power amplifier. Although not shown in FIG. 6, the electronic device may radiate the output signal into the air through a filter and an antenna.

Figure 7:
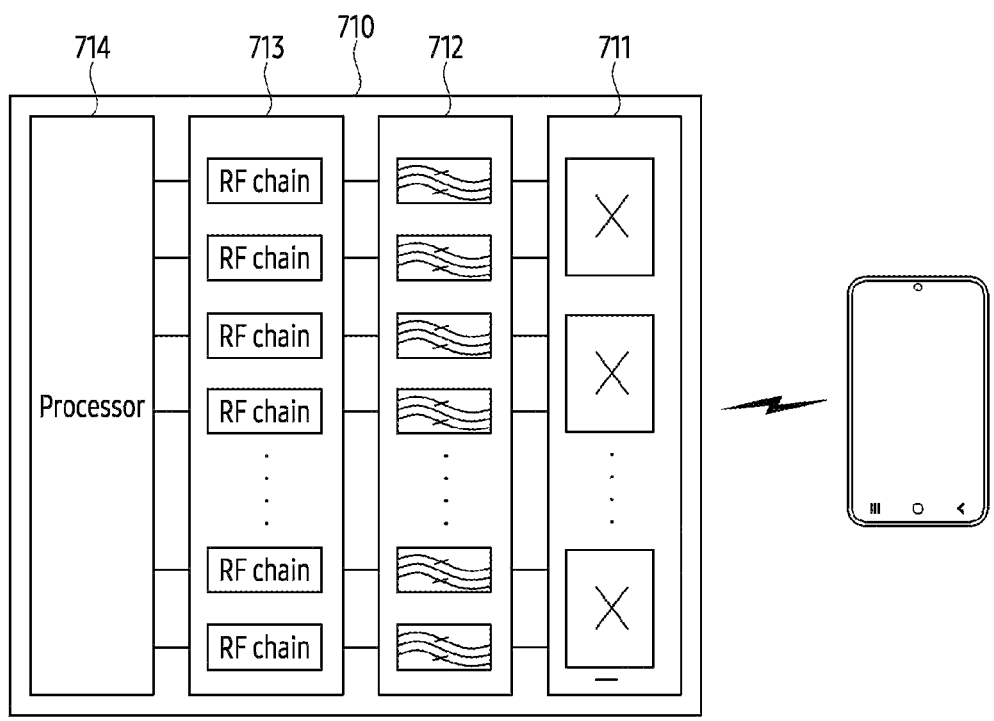
FIG. 7 is a diagram illustrating an example configuration of an electronic device including a transmission circuit for resource allocation based DPD control according to embodiments.

FIG. 7 is a diagram illustrating an example configuration of an electronic device including a transmission circuit for resource allocation based DPD control according to embodiments. The resource allocation based DPD control may refer, for example, to activating at least one DPD unit of a DPD circuit for memory compensation and deactivating at least one other DPD unit based on a ratio of resource actually allocated within a channel bandwidth. Modeling may be performed only for resources actually allocated in a frequency domain, rather than always compensating for non-linearity of a power amplifier using all DPD units. In low traffic, as the calculation time is reduced so the convergence speed improves, the modeling is possible to respond quickly to changes in the temperature, environment, and the like of the power amplifier.

An electronic device 710 may include, for example, and without limitation, a base station 110 or MMU of the base station 110 of FIG. 1. Meanwhile, unlike illustrated, the present disclosure does not exclude that the electronic device 710 may be implemented in a terminal 120 of FIG. 1. Not only a communication module including the DPD circuit mentioned through FIGS. 1 to 6, but also the electronic device including the same is included in embodiments of the present disclosure.

Referring to FIG. 7, an example functional configuration of the electronic device 710 is illustrated. The electronic device 710 may include an antenna unit (e.g., including at least one antenna) 711, a filter unit (e.g., including at least one filter) 712, a radio frequency (RF) processing unit (e.g., including various circuitry) 713, and a processor (e.g., including processing circuitry) 714.

The antenna unit 711 may include one or more antennas. The antenna performs functions for transmitting and receiving a signal through a wireless channel The antenna may include a radiator formed of a conductor or a conductive pattern formed on a substrate (e.g., PCB). The antenna may radiate the up-converted signal on the wireless channel or may obtain the signal radiated by another device. Each antenna may be referred to as an antenna element or an antenna device. In embodiments, the antenna unit 711 may include an antenna array in which a plurality of antenna elements form an array. The antenna unit 711 may be electrically connected to the filter unit 712 through RF signal lines. The antenna unit 711 may be mounted on the PCB including the plurality of antenna elements. The PCB may include the plurality of RF signal lines connecting each antenna element and a filter of the filter unit 712. These RF signal lines may be referred to as a feeding network.

The antenna unit 711 may provide the received signal to the filter unit 712 or may radiate the signal provided from the filter unit 712 into the air. The filter unit 712 may perform filtering to transmit a signal of a desired frequency. The filter unit 712 may perform a function of selectively identifying a frequency by forming resonance. The filter unit 712 may include at least one of a band pass filter, a low pass filter, a high pass filter, or a band reject filter. The filter unit 712 may include RF circuits for obtaining a signal of a frequency band for transmission or a frequency band for reception. The filter unit 712 according to embodiments may electrically connect the antenna unit 711 and the RF processing unit 713.

The RF processing unit 713 may include a plurality of RF paths. The RF path may be a unit of a path through which the signal received through the antenna or the signal radiated through the antenna passes. At least one RF path may be referred to as an RF chain. The RF chain may include a plurality of RF elements. The RF elements may include an amplifier, a mixer, an oscillator, a DAC, an ADC, and the like. For example, the RF processing unit 713 may include the mixer for up-converting a transmission signal to a transmission frequency. A transmission path of the RF processing unit 713 may include the DAC, the mixer, the oscillator, and the amplifier. A reception path of the RF processing unit 713 may include the ADC, the mixer, the oscillator, and an LNA. The transmission path may further include a coupler (or combiner). In addition, for example, the RF processing unit 713 may include the mixer for down-converting an analog RF reception signal to a digital frequency. The reception path of the RF processing unit 713 may include the low-noise amplifier (LNA), the mixer, the oscillator, and the ADC. The reception path may further include the coupler or an attenuator.

RF components of the RF processing unit may be implemented in the PCB. The electronic device 710 may include a structure in which the antenna unit 711-the filter unit 712-the RF processing unit 713 are stacked in this order. The antennas and the RF components of the RF processing unit may be implemented on the PCB, and filters may be repeatedly fastened between the PCB and the PCB to form a plurality of layers.

The processor 714 may include various processing circuitry and control overall operations of the electronic device 710. The processor 714 may include various modules for performing communication. Although one processor is illustrated in FIG. 7, the processor 714 may include a plurality of processors. The processor 714 may include modules for digital signal processing. For example, the processor 714 may include a component (e.g., a baseband modem) for controlling the DPD circuit. For another example, the processor 714 may include a component (e.g., a chip) for operating the DPD circuit. When transmitting data, the processor 714 generates complex symbols by encoding and modulating the transmission bit sequence. In addition, for example, when receiving data, the processor 714 restores the reception bit sequence. through demodulation and decoding of a baseband signal. The processor 714 may perform functions of a protocol stack required by a communication standard. In an embodiment, each DPD unit of the DPD circuit comprises a circuitry for performing a designated function.

In FIG. 7, a functional configuration of the electronic device 710 is described as an equipment in which an antenna structure of the present disclosure may be utilized. However, the example illustrated in FIG. 7 is merely an example configuration for utilizing the antenna structure according to embodiments of the present disclosure described through FIGS. 1 to 6, and embodiments of the present disclosure are not limited to the components of the equipment illustrated in FIG. 7. Thus, an antenna module including an antenna structure, a communication equipment of other configuration, and an antenna structure itself may also be understood as an embodiment of the present disclosure.

In a digital pre-distortion system, the coefficient of each DPD unit of the DPD circuit was adjusted. However, such coefficient adjustment is performed by modeling performed based on a difference between an input signal of the PA (e.g., a digital signal input to the DAC) and an output signal of the PA (e.g., a digital signal fed back by the coupler). However, instead of determining the coefficient for each DPD unit of all DPD units, the processor according to embodiments of the present disclosure determines a function operation (e.g., coefficient) for each DPD unit of one or more DPD units as many as required number (e.g., memory order). Here, the required number may be determined based on the effective bandwidth. The one or more DPD units may be identified based on the effective bandwidth and the entire bandwidth. In other words, the processor according to embodiments may not simply determine parameters of the DPD circuit, but may adaptively identify the memory order (e.g., the number of activated DPD units) based on the amount of allocated resources, and may determine a function for each activated DPD unit and the coefficient of each term. Accordingly, the DPD circuit most suitable for the amount of actually allocated resources may be configured.

According to various example embodiments, method performed by an electronic device may comprise: identifying a channel bandwidth; identifying one or more active digital pre-distortion (DPD) units comprising circuitry from a plurality of DPD units of a DPD circuit, based on the channel bandwidth, and the amount of resources allocated within the channel bandwidth; generating a DPD output signal of the DPD circuit based on the one or more active DPD units; generating an amplifier output signal, based on the DPD output signal of the DPD circuit, a digital-to-analog converter (DAC), and a power amplifier (PA), wherein at least one DPD unit among the plurality of DPD units of the DPD circuit, which is different from the one or more DPD units, may be deactivated while the DPD output signal is generated.

According to an example embodiment, the amount of the allocated resources may be identified based on an input signal from the DPD circuit to the DAC.

According to an example embodiment, the input signal from the DPD circuit to the DAC may be used to obtain a number of samples having a power spectral density (PSD) greater than a threshold. The amount of the allocated resources may be identified based on a multiplication of a ratio of the number of the samples having the power spectral density (PSD) greater than the threshold with respect to a Fast Fourier Transform (FFT) size, and a sampling rate.

According to an example embodiment, the one or more DPD units may be identified based on a ratio of the amount of the allocated resources with respect to the channel bandwidth.

According to an example embodiment, the identifying of the one or more active DPD units may comprise: identifying at least one first active DPD unit based on a ratio of the amount of the allocated resources with respect to the channel bandwidth being within a first range. The identifying of the one or more active DPD units may comprise: identifying at least one second active DPD unit based on a ratio of the amount of the allocated resources with respect to the channel bandwidth being within a second range higher than the first range. A number of the at least one second active DPD unit may be greater than a number of the at least one first active DPD unit.

According to an example embodiment, the DPD circuit may comprise: a finite impulse response (FIR) filter. A length of the FIR filter may correspond to a number of the plurality of DPD units of the DPD circuit.

According to an example embodiment, the method may further comprise: generating a DPD output signal of the DPD circuit based on the plurality of DPD units of the DPD circuit without a deactivated DPD unit, based on resource blocks (RBs) corresponding to a size of the channel bandwidth being allocated.

According to an example embodiment, in the one or more active DPD units, a coefficient of each DPD unit may be based on an input signal of the PA before generating the DPD output signal, an output signal of the PA before generating the DPD output signal, and a number of the one or more active DPD units.

According to an example embodiment, a number of terms of a polynomial of a function of each DPD unit in the one or more active DPD units may be determined based on the amount of the allocated resource.

According to an example embodiment, an input signal of the PA may comprise an input signal of the DAC before generating the DPD output signal. An output signal of the PA may comprise an output signal of an analog-to-digital converter (ADC) before generating the DPD output signal.

According to an example embodiment, the generating of the DPD output signal comprise: transmitting, to the DPD circuit, at least one of a control signal to turn on a switch corresponding to each DPD unit of the one or more active DPD units, or a control signal to turn off a switch corresponding to each DPD unit of the at least one DPD unit.

According to various example embodiments, an electronic device may comprise: a processor; a digital pre-distortion (DPD) circuit; a digital-to-analog converter (DAC); and a power amplifier (PA). The processor may be configured to: identify a channel bandwidth; identify one or more active digital pre-distortion (DPD) units comprising circuitry from a plurality of DPD units of the DPD circuit, based on the channel bandwidth and the amount of resources allocated within the channel bandwidth; control the DPD circuit to generate a DPD output signal based on the one or more active DPD units; generate an amplifier output signal, based on the DPD output signal of the DPD circuit, through the digital-to-analog converter (DAC), and the power amplifier (PA); wherein at least one DPD unit among the plurality of DPD units of the DPD circuit, which is different from the one or more DPD units, may be deactivated while the DPD output signal is generated.

According to an example embodiment, the amount of the allocated resources may be identified based on an input signal from the DPD circuit to the DAC.

According to an example embodiment, the input signal from the DPD circuit to the DAC may be used to obtain a number of samples having a power spectral density (PSD) greater than a threshold. The amount of the allocated resources may be identified based on a multiplication of a ratio of the number of samples having the power spectral density (PSD) greater than the threshold with respect to a fast fourier transform (FFT) size, and a sampling rate.

According to an example embodiment, the one or more DPD units may be identified based on a ratio of the amount of the allocated resources with respect to the channel bandwidth.

According to an example embodiment, the processor may be configured to: identify the one or more active DPD units, identify at least one first active DPD unit based on a ratio of the amount of the allocated resources with respect to the channel bandwidth being within a first range; identify the one or more active DPD units, identify at least one second active DPD unit based on a ratio of the amount of the allocated resources with respect to the channel bandwidth being within a second range higher than the first range, wherein a number of the at least one second active DPD unit may be greater than a number of the at least one first active DPD unit.

According to an example embodiment, the DPD circuit may comprise a finite impulse response (FIR) filter. A length of the FIR filter may correspond to a number of the plurality of DPD units of the DPD circuit.

According to an example embodiment, the processor may be further configured to: control the DPD circuit to generate a DPD output signal based on the plurality of DPD units of the DPD circuit without a deactivated DPD unit, based on resource blocks (RBs) corresponding to a size of the channel bandwidth being allocated.

According to an example embodiment, in the one or more active DPD units, a coefficient of each DPD unit may be based on an input signal of the PA before generating the DPD output signal, an output signal of the PA before generating the DPD output signal, and a number of the one or more active DPD units.

According to an example embodiment, a number of terms of a polynomial of a function of each DPD unit in the one or more active DPD units may be determined based on the amount of the allocated resources.

According to an example embodiment, an input signal of the PA may comprise an input signal of the DAC before generating the DPD output signal. An output signal of the PA may comprise an output signal of an analog-to-digital converter (ADC) before generating the DPD output signal.

According to an example embodiment, the processor may be configured to: generate the DPD output signal, transmit to the DPD circuit at least one of a control signal to turn on a switch corresponding to each DPD unit of the one or more active DPD units, or a control signal to turn off the switch corresponding to each DPD unit of the at least one deactivated DPD unit.

The DPD circuit according to various example embodiments of the present disclosure may improve non-linear characteristic of the power amplifier and may compensate for distortion component due to memory effect. The processor controlling the DPD circuit may calculate parameters applied to the DPD circuit by comparing the input signal of the power amplifier with the coupled feedback signal. According to an embodiment, the processor may detect an effective bandwidth of the input signal. The processor may identify at least one active DPD unit among a plurality of DPD units of the DPD circuit based on the ratio of the effective bandwidth in respect to the channel bandwidth. The processor may turn on the switch connected to each DPD unit of at least one active DPD unit through a control signal. The DPD unit for the current input signal, which is the first DPD unit of at least one active DPD unit, may not be connected to a separate switch. In other words, the first DPD unit is always active.

According to an embodiment, the processor may calculate parameters for function operation (or multiplication of coefficient) to be applied to the active DPD units. For example, the processor may calculate the coefficient to be multiplied in each active DPD unit of the DPD circuit having an FIR filter structure. The calculation process of the parameters may be referred to as DPD modeling. An electronic device according to embodiments may compensate for the distortion component of the power amplifier by varying a memory order and a non-linear model according to the effective bandwidth.

Since the electronic device according to embodiments of the present disclosure determines the memory order of the DPD based on the effective bandwidth of the input signal, an issue of overfitting due to incorrect modeling of the frequency section of an operating channel to which RB is not allocated may be resolved. In particular, at a rated output using the entire frequency band, a high-complexity DPD circuit is configured. Thus, the DPD circuit may well compensate for the distortion characteristic of the power amplifier. In low traffic, a low complexity DPD circuit is configured. To compensate for the relatively small memory effect, a small number of DPD units operate. Since the calculation time is reduced, the time for the output of the DPD circuit to converge is reduced. Thus, it is possible to model a transmission circuit that quickly reflects changes in peripheral factors such as temperature, signal, and environment of the power amplifier.

Methods according to embodiments described in the claims or the present disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more program include instructions that cause the electronic device to execute methods according to embodiments described in the claim or the present disclosure.

Such program (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile disc (DVD) or other form of optical storage, magnetic cassette. Also, the program may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the present disclosure through an external port. In addition, a separate storage device on the communication network may access a device performing an embodiment of the present disclosure.

In the above-described example embodiments of the present disclosure, a component included in the disclosure is expressed in singular or plural according to the presented specific embodiment. However, singular or plural expression is chosen appropriately for the situation presented for convenience of explanation, and the present disclosure is not limited to singular or plural component, and even if the component is expressed in plural, it may be configured with singular, or even if it is expressed in singular, it may be configured with plural.

Meanwhile, in the detailed description of the present disclosure, the specific embodiment have been described, but it goes without saying that various modification is possible within the limit not departing from the scope of the present disclosure.

What is claimed is:

1. A method performed by an electronic device, the method comprising:
    identifying a channel bandwidth;
    identifying one or more active digital pre-distortion (DPD) units from a plurality of DPD units of a DPD circuit, based on the channel bandwidth and an amount of resources allocated within the channel bandwidth;
    generating a DPD output signal of the DPD circuit based on the one or more active DPD units;
    generating an amplifier output signal, based on the DPD output signal of the DPD circuit, a digital-to-analog converter (DAC), and a power amplifier (PA),
    wherein at least one DPD unit among the plurality of DPD units of the DPD circuit, which is different from the one or more active DPD units, is deactivated while the DPD output signal is generated.

2. The method of claim 1, wherein the amount of the allocated resources is identified based on an input signal from the DPD circuit to the DAC.

3. The method of claim 2, wherein the input signal from the DPD circuit to the DAC is used to obtain a number of samples having a power spectral density greater than a threshold, and
    wherein the amount of the allocated resources is identified based on a multiplication of:
    a ratio of the number of samples having the power spectral density greater than the threshold with respect to a fast fourier transform (FFT) size, and
    a sampling rate.

4. The method of claim 1, wherein the one or more active DPD units are identified based on a ratio of the amount of the allocated resources with respect to the channel bandwidth.

5. The method of claim 1, wherein the identifying of the one or more active DPD units comprises:
    identifying at least one first active DPD unit based on a ratio of the amount of the allocated resources with respect to the channel bandwidth being within a first range; and
    identifying at least one second active DPD unit based on a ratio of the amount of the allocated resources with respect to the channel bandwidth being within a second range higher than the first range, and
    wherein a number of the at least one second active DPD unit is greater than a number of the at least one first active DPD unit.

6. The method of claim 1, wherein the DPD circuit comprises a finite impulse response (FIR) filter, and
    wherein a length of the FIR filter corresponds to a total number of DPD units in the plurality of DPD units of the DPD circuit.

7. The method of claim 1, further comprising:
    generating an DPD output signal of the DPD circuit based on the plurality of DPD units of the DPD circuit without a deactivated DPD unit, in case that resource blocks (RBs) corresponding to a size of the channel bandwidth are allocated.

8. The method of claim 1, wherein a number of terms of a polynomial of a function of each DPD unit in the one or more active DPD units is determined based on the amount of the allocated resources.

9. The method of claim 1,
    wherein an input signal of the PA comprises an input signal of the DAC before generating the DPD output signal, and
    wherein an output signal of the PA comprises an output signal of an analog-to-digital converter (ADC) before generating the DPD output signal.

10. The method of claim 1, wherein the generating of the DPD output signal comprises:
transmitting, to the DPD circuit, at least one of:
a control signal to turn on a switch corresponding to each DPD unit of the one or more active DPD units, or
a control signal to turn off a switch corresponding to each DPD unit of the at least one DPD unit.

11. An electronic device, comprising:
at least one processor comprising processing circuitry;
a digital pre-distortion (DPD) circuit;
a digital-to-analog converter (DAC); and
a power amplifier (PA),
wherein the at least one processor is individually and/or collectively configured to:
identify a channel bandwidth;
identify one or more active digital pre-distortion (DPD) units from a plurality of DPD units of the DPD circuit, based on the channel bandwidth and an amount of resources allocated within the channel bandwidth;
control the DPD circuit to generate a DPD output signal of the DPD circuit based on the one or more active DPD units;
generate an amplifier output signal, based on the DPD output signal of the DPD circuit, through the DAC, and the PA,
wherein at least one DPD unit among the plurality of DPD units of the DPD circuit, which is different from the one or more active DPD units, is deactivated while the DPD output signal is generated.

12. The electronic device of claim 11, wherein the amount of the allocated resources is identified based on an input signal from the DPD circuit to the DAC.

13. The electronic device of claim 12,
wherein the input signal from the DPD circuit to the DAC is used to obtain a number of samples having a power spectral density (PSD) greater than a threshold, and
wherein the amount of the allocated resources is identified based on a multiplication of:
a ratio of the number of samples having the power spectral density (PSD) greater than the threshold with respect to a fast fourier transform (FFT) size, and
a sampling rate.

14. The electronic device of claim 11, wherein the one or more active DPD units are identified based on a ratio of the amount of the allocated resources with respect to the channel bandwidth.

15. The electronic device of claim 14, wherein the at least one processor, to identify the one or more active DPD units, is individually and/or collectively configured to:
identify at least one first active DPD unit based on a ratio of the amount of the allocated resources with respect to the channel bandwidth being within a first range, and
identify at least one second active DPD unit based on a ratio of the amount of the allocated resources with respect to the channel bandwidth being within a second range higher than the first range, and
wherein a number of the at least one second active DPD unit is greater than a number of the at least one first active DPD unit.

16. The electronic device of claim 11,
wherein the DPD circuit comprises a finite impulse response (FIR) filter, and
wherein a length of the FIR filter corresponds to a total number of DPD units in the plurality of DPD units of the DPD circuit.

17. The electronic device of claim 11, wherein the at least one processor is individually and/or collectively configured to:
control the DPD circuit to generate a DPD output signal of the DPD circuit based on the plurality of DPD units of the DPD circuit without a deactivated DPD unit, in case that resource blocks (RBs) corresponding to a size of the channel bandwidth are allocated.

18. The electronic device of claim 11, wherein a number of terms of a polynomial of a function of each DPD unit in the one or more active DPD units is determined based on the amount of the allocated resources.

19. The electronic device of claim 11,
wherein an input signal of the PA comprises an input signal of the DAC before generating the DPD output signal, and
wherein an output signal of the PA comprises an output signal of an analog-to-digital converter (ADC) before generating the DPD output signal.

20. The electronic device of claim 11, wherein the at least one processor, to generate the DPD output signal, is individually and/or collectively configured to transmit, to the DPD circuit, at least one of:
a control signal to turn on a switch corresponding to each DPD unit of the one or more active DPD units, or
a control signal to turn off a switch corresponding to each DPD unit of the at least one deactivated DPD unit.

* * * * *